United States Patent
Yang et al.

(10) Patent No.: US 11,558,144 B2
(45) Date of Patent: Jan. 17, 2023

(54) RESOLVING DOWNLINK CONTROL INFORMATION AMBIGUITY

(71) Applicant: QUALCOMM Incorporated, San Diego, CA (US)

(72) Inventors: Wei Yang, San Diego, CA (US); Wanshi Chen, San Diego, CA (US); Seyedkianoush Hosseini, San Diego, CA (US); Huilin Xu, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/949,763

(22) Filed: Nov. 13, 2020

(65) Prior Publication Data

US 2021/0152274 A1 May 20, 2021

Related U.S. Application Data (60) Provisional application No. 62/937,236, filed on Nov. 18, 2019.

(51) Int. Cl.
*H04L 1/00* (2006.01)
*H04W 72/04* (2009.01)
(Continued)

(52) U.S. Cl.
CPC ............ *H04L 1/003* (2013.01); *H04L 1/0008* (2013.01); *H04W 28/06* (2013.01);
(Continued)

(58) Field of Classification Search
CPC ..... H04W 76/11; H04W 76/04; H04W 28/06; H04W 72/042; H04W 72/10;
(Continued)

(56) References Cited

U.S. PATENT DOCUMENTS

2013/0223378 A1  8/2013  Gao et al.
2015/0117336 A1*  4/2015  Huss ................... H04W 72/042
                                                  370/329
(Continued)

FOREIGN PATENT DOCUMENTS

EP          2182689 A2     5/2010

OTHER PUBLICATIONS

Huawei, et al., "Correction on DCI Format Ambiguity," 3GPP Draft, 3GPP TSG RAN WG1 Meeting #96bis, R1-1905251, 3rd Generation Partnership Project (3GPP), Mobile Competence Centre, 650, Route Des Lucioles, F-06921, Sophia-Antipolis Cedex, France, vol. RAN WG1., No. Xi 'an, China, Apr. 8, 2019- Apr. 12, 2019, Apr. 7, 2019 (Apr. 7, 2019), XP051700326, 11 pages ,Retrieved from the Internet: URL: http://www.3gpp.org/ftp/Meetings%5F3GPP%5FSYNC/RAN1/Docs/R1%2D1905251%2Ezip [retrieved on Apr. 7, 2019] p. 11.

(Continued)

*Primary Examiner* — Candal Elpenord
(74) *Attorney, Agent, or Firm* — Harrity & Harrity LLP/Qualcomm Incorporated (57) ABSTRACT

Various aspects of the present disclosure generally relate to wireless communication. In some aspects, a wireless communication device may determine that a first set of downlink control information (DCI) formats is associated with a same DCI size as a second set of DCI formats, and perform a padding operation so that the first set of DCI formats and the second set of DCI formats are associated with different DCI sizes. Numerous other aspects are provided.

30 Claims, 6 Drawing Sheets

(51) Int. Cl.
*H04W 72/12* (2009.01)
*H04W 72/10* (2009.01)
*H04W 76/11* (2018.01)
*H04W 28/06* (2009.01)

(52) U.S. Cl.
CPC ......... *H04W 72/042* (2013.01); *H04W 72/10* (2013.01); *H04W 72/1268* (2013.01); *H04W 76/11* (2018.02)

(58) Field of Classification Search
CPC .. H04W 72/1268; H04W 72/04; H04L 1/003; H04L 1/0007; H04L 1/0008
USPC .................................................. 370/329–330
See application file for complete search history.

(56) References Cited

U.S. PATENT DOCUMENTS

| | | | |
|---|---|---|---|
| 2019/0191424 A1* | 6/2019 | Wang | H04W 72/0446 |
| 2019/0274032 A1* | 9/2019 | Chatterjee | H04W 72/0466 |
| 2019/0297607 A1* | 9/2019 | Kim | H04L 5/0053 |
| 2020/0100248 A1* | 3/2020 | Kim | H04L 5/0092 |
| 2020/0304230 A1* | 9/2020 | Papasakellariou | H04L 1/0006 |
| 2021/0022142 A1* | 1/2021 | Wu | H04L 1/1887 |
| 2021/0051736 A1* | 2/2021 | Jeon | H04W 76/18 |
| 2021/0160035 A1* | 5/2021 | Kittichokechai | H04L 5/0064 |
| 2021/0352656 A1* | 11/2021 | Choi | H04L 1/1812 |

OTHER PUBLICATIONS

International Search Report and Written Opinion—PCT/US2020/070795—ISA/EPO—dated Mar. 2, 2021.

* cited by examiner

RESOLVING DOWNLINK CONTROL INFORMATION AMBIGUITY

CROSS-REFERENCE TO RELATED APPLICATION

This Patent Applications claims priority to U.S. Provisional Patent Application No. 62/937,236, filed on Nov. 18, 2019, entitled "RESOLVING DOWNLINK CONTROL INFORMATION AMBIGUITY," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for resolving downlink control information ambiguity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining that a first set of downlink control information (DCI) formats is associated with a same DCI size as a second set of DCI formats; and performing a padding operation so that the first set of DCI formats and the second set of DCI formats are associated with different DCI sizes.

In some aspects, a method of wireless communication, performed by a wireless communication device, may include determining that a first DCI format and a second DCI format are aligned; and decoding or encoding a physical downlink control channel (PDCCH) in accordance with a selected DCI format, of the first DCI format and the second DCI format, based at least in part on a rule indicating whether the PDCCH is to be decoded in accordance with the first DCI format or the second DCI format.

In some aspects, a wireless communication device for wireless communication may include memory and one or more processors operatively coupled to the memory. The memory and the one or more processors may be configured to determine that a first set of DCI formats is associated with a same DCI size as a second set of DCI formats; and perform a padding operation so that the first set of DCI formats and the second set of DCI formats are associated with different DCI sizes.

In some aspects, a wireless communication device for wireless communication may include memory and one or more processors operatively coupled to the memory. The memory and the one or more processors may be configured to determine that a first DCI format and a second DCI format are aligned; and decode a PDCCH in accordance with a selected DCI format, of the first DCI format and the second DCI format, based at least in part on a rule indicating whether the PDCCH is to be decoded in accordance with the first DCI format or the second DCI format.

In some aspects, a non-transitory computer-readable medium may store one or more instructions for wireless communication. The one or more instructions, when executed by one or more processors of a wireless communication device, may cause the one or more processors to: determine that a first set of DCI formats is associated with a same DCI size as a second set of DCI formats; and perform a padding operation so that the first set of DCI formats and the second set of DCI formats are associated with different DCI sizes.

In some aspects, a non-transitory computer-readable medium may store one or more instructions for wireless communication. The one or more instructions, when executed by one or more processors of a wireless communication device, may cause the one or more processors to: determine that a first DCI format and a second DCI format are aligned; and decode a PDCCH in accordance with a selected DCI format, of the first DCI format and the second DCI format, based at least in part on a rule indicating whether the PDCCH is to be decoded in accordance with the first DCI format or the second DCI format.

In some aspects, an apparatus for wireless communication may include means for determining that a first set of DCI formats is associated with a same DCI size as a second set of DCI formats; and means for performing a padding operation so that the first set of DCI formats and the second set of DCI formats are associated with different DCI sizes.

In some aspects, an apparatus for wireless communication may include means for determining that a first DCI format and a second DCI format are aligned; and means for decoding a PDCCH in accordance with a selected DCI format, of the first DCI format and the second DCI format, based at least in part on a rule indicating whether the PDCCH is to be decoded in accordance with the first DCI format or the second DCI format.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 4G, 5G, or NR radio access technology (RAT), aspects of the present disclosure can be applied to other RATs, such as a 3G RAT, a 4G RAT, and/or a RAT subsequent to 5G (e.g., 6G).

Figure 1:
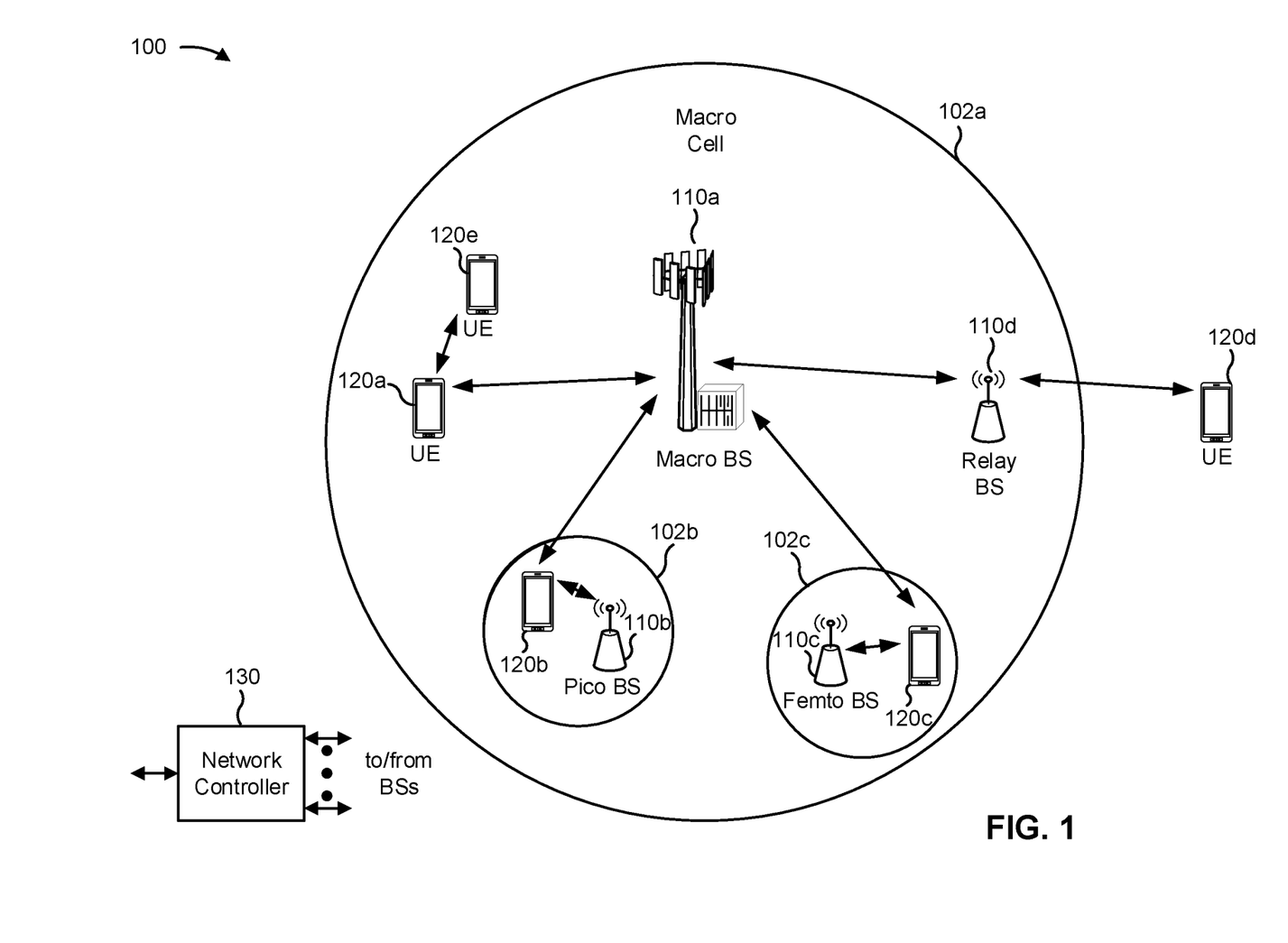
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or midband frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
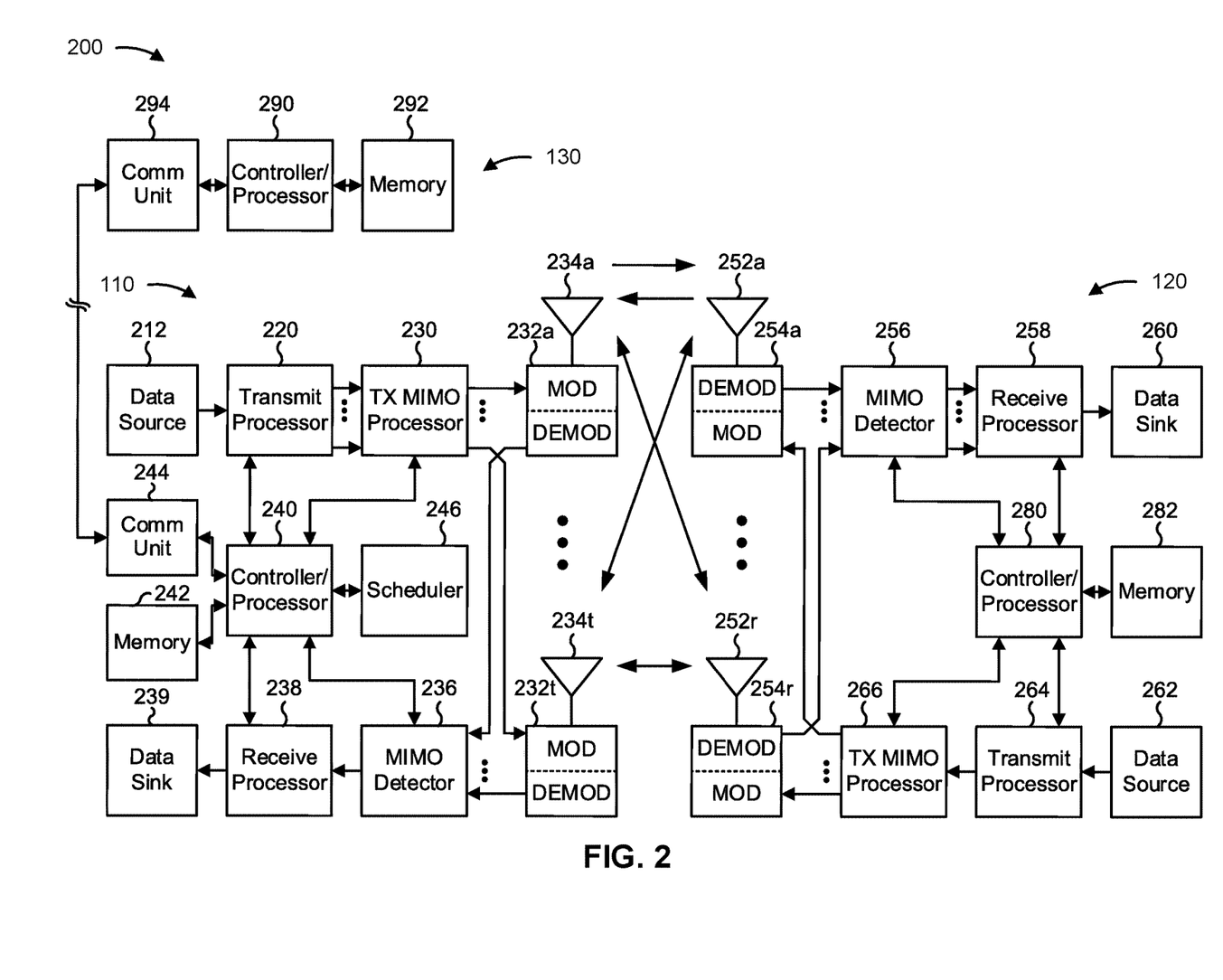
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resolving downlink control information (DCI) ambiguity, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 or the UE 120, may cause the base station 110 or the UE 120 to perform or direct operations of process 500 of FIG. 5, process 600 of FIG. 6, and/or other processes as described herein. A scheduler 246 may schedule UEs for data transmission on the downlink and/or uplink.

"Wireless communication device" may refer to UE 120 and/or to BS 110. In some aspects, a wireless communication device may include means for determining that a first set of DCI formats is associated with a same DCI size as a second set of DCI formats; means for performing a padding operation so that the first set of DCI formats and the second set of DCI formats are associated with different DCI sizes; means for performing a communication using one or more of the first set of DCI formats or the second set of DCI formats as modified based at least in part on the padding operation; means for determining whether a third set of DCI formats is associated with a same DCI size as one or more of the first set of DCI formats or the second set of DCI formats; means for selectively performing another padding operation with regard to the third set of DCI formats so that the third set of DCI formats is not associated with a same DCI size as the first set of DCI formats or the second set of DCI formats; means for determining whether a first DCI format of the third set of DCI formats and a second DCI format of the third set of DCI formats have a same DCI size; means for selectively performing an operation that aligns DCI sizes of the first DCI format and the second DCI format with each other; means for determining that a first DCI format and a second DCI format are aligned; means for decoding a physical downlink control channel (PDCCH) in accordance with a selected DCI format, of the first DCI format and the second DCI format, based at least in part on a rule indicating whether the PDCCH is to be decoded in accordance with the first DCI format or the second DCI format; means for receiving or transmitting radio resource control (RRC) signaling indicating the rule; means for dropping a DCI format, of the first DCI format and the second DCI format, other than the selected DCI format, wherein the selected DCI format is associated with a higher priority level of the first priority level and the second priority level and the dropped DCI format is associated with a lower priority level of the first priority level and the second priority level; and/or the like. In some aspects, such means may include one or more components of BS 110 or UE 120 described in connection with FIG. 2, such as controller/ processor 280, transmit processor 264, TX MIMO processor 266, MOD 254, antenna 252, DEMOD 254, MIMO detector 256, receive processor 258, antenna 234, DEMOD 232, MIMO detector 236, receive processor 238, controller/ processor 240, transmit processor 220, TX MIMO processor 230, MOD 232, antenna 234, and/or the like.

As indicated above, FIG. 2 is provided as an example. Other examples may differ from what is described with regard to FIG. 2.

A time-domain resource allocation (TDRA) for a data channel (e.g., a downlink data channel such as a physical downlink shared channel (PDSCH), an uplink data channel such as a physical uplink shared channel (PUSCH), and/or the like) may be indicated in a grant, such as a downlink grant or an uplink grant. For example, the grant may be received in DCI. The time-domain resource allocation may include an index associated with a table, wherein each entry of the table indicates a set of symbols (e.g., OFDM symbols) to be used for the data channel, a K0 value (e.g., a delay between the grant and the corresponding data channel), a mapping type, and/or the like. In some cases, the grant may be associated with other information, or other information may be determined based at least in part on the grant. The grant may be associated with a configured table (e.g., when the configured table has been configured in a higher layer) or a default table (e.g., when no configured table is configured). It should be noted that the techniques and apparatuses described herein are applicable for DCI carrying any type of information and are not limited to those involving TDRAs.

The DCI may be in one or more control channel elements (CCEs) of a control resource set (CORESET). A UE may not know the exact location of the DCI before the DCI is received. A CORESET may include various search spaces. A UE may search the search spaces, based at least in part on physical downlink control channel (PDCCH) candidates (e.g., search hypotheses), to identify a DCI relevant to the UE. For example, the DCI relevant to the UE may be scrambled using a radio network temporary identifier (RNTI) (e.g., a cell RNTI (C-RNTI), a modulation and coding scheme C-RNTI (MCS-C-RNTI), a configured scheduling RNTI (CS-RNTI), and/or the like) that is known to or associated with the UE. The UE may search one or more common search spaces (CSSs) that may be searched by multiple UEs of a cell, and may search one or more UE-specific search spaces (UESSs) that may be specific to the UE. For example, the UE may search a CSS using CSS candidates (e.g., PDCCH candidates in the CSS) and may search a UESS using UESS candidates (e.g., PDCCH candidates in the UESS). A CSS may at least partially overlap a UESS.

In some circumstances, two PDCCH candidates may be indistinguishable from each other. For example, two PDCCH candidates may be indistinguishable from each other if the two PDCCH candidates are transmitted in a same set of CCEs, if the two PDCCH candidates correspond to the same PDCCH scrambling identifier, if the two PDCCH candidates have the same DCI size, and if cyclic redundancy check (CRC) bits of the two PDCCH candidates are scrambled using the same RNTI. Thus, if two DCI PDCCH candidates associated with different DCI formats satisfy the above conditions, then a UE may not be able to distinguish which DCI format is to be used for a decoded DCI.

In some cases, a first set of DCI formats (e.g., DCI Formats 0_2 and 1_2 as indicated by a 3GPP Technical Specification) may be size-aligned, by configuration, with a second set of DCI formats and/or a third set of DCI formats (e.g., DCI Formats 0_0 and 1_0, and DCI Formats 1_0 and 1_1 as indicated by a 3GPP Technical Specification). If the conditions described above for PDCCH indistinguishability are satisfied for a DCI format of the first set of DCI formats and a DCI format of the second or third sets of DCI formats, then the UE may not be capable of distinguishing which DCI format is used for a PDCCH. This may lead to diminished throughput and wasted computing resources due to uninterpretable or misinterpreted DCI, and may reduce the range of usable DCI formats and configurations for the UE.

Some techniques and apparatuses described herein provide for one or more padding operations to be performed so that different sets of DCI formats are associated with different DCI sizes. For example, if each set of DCI formats, of the first set of DCI formats, the second set of DCI formats, and the third set of DCI formats, is associated with a different DCI size, then the corresponding PDCCHs may be distinguishable from each other. Thus, the UE may differentiate which DCI format is used for a PDCCH, thereby increased throughput and increasing the range of usable DCI formats and configurations for the UE. Furthermore, reducing the number of DCI sizes to be configured for the UE reduces complexity and the number of blind detections needed to decode a PDCCH, thereby conserving computing resources.

Some techniques and apparatuses described herein provide a rule so that indistinguishable DCI formats can be handled by the UE. For example, for a PDCCH associated with two possible DCI formats, the UE may determine which DCI format is to be used to decode the PDCCH based at least in part on a rule. Thus, the UE may resolve the ambiguity in the DCI format without modifying the DCI configuration, thereby increasing throughput and increasing the range of usable DCI formats and configurations for the UE without increasing a DCI size of the DCI formats.

Figure 3:
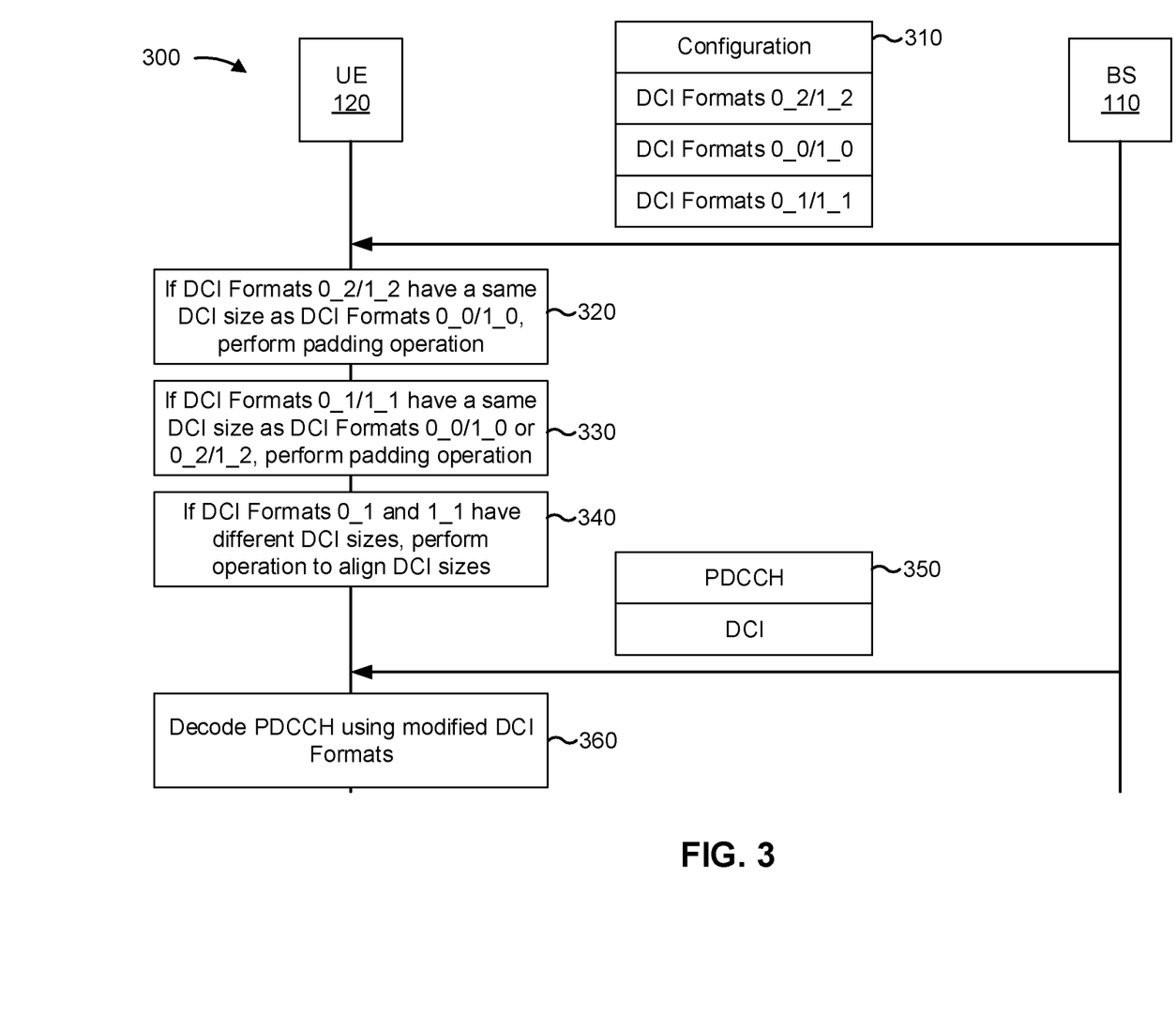
FIG. 3 is a diagram illustrating an example of configuring DCI sizes for distinguishability of DCI formats, in accordance with various aspects of the present disclosure.

FIG. 3 is a diagram illustrating an example 300 of configuring DCI sizes for distinguishability of DCI formats, in accordance with various aspects of the present disclosure. As shown, example 300 includes a BS 110 and a UE 120.

As shown by reference number 310, the BS 110 may provide configuration information to the UE 120. For example, the configuration information may identify a configuration for one or more sets of DCI formats. Here, the configuration information identifies configurations for a first set of DCI formats (DCI Formats 0_2 and 1_2), a second set of DCI formats (DCI Formats 0_0 and 1_0), and a third set of DCI formats (DCI Formats 0_1 and 1_1). In some aspects, the first set of DCI formats may be for ultra reliable low latency communications, the second set of DCI formats may be for fallback uplink or downlink scheduling, and the third set of DCI formats may be for nominal uplink or downlink scheduling. The configuration information may include radio resource control (RRC) information or another type of information. The techniques and apparatuses described herein can be applied for any combination of DCI formats, whether or not the specific identifiers of the DCI formats are explicitly disclosed herein.

Each DCI format may be composed of multiple fields. The length of one or more of the multiple fields may be indicated in the configuration information. In some aspects, the DCI size of a DCI format of one set of DCI formats may be the same as the DCI size of a different DCI format of another set of DCI formats. A "DCI size" of a DCI may refer to a payload size of the DCI, a number of bits used to convey the DCI, a size of a channel used to convey the DCI, or the like. In this case, some PDCCHs may be indistinguishable from one another, leading to ambiguity regarding which DCI format is used to encode a PDCCH. The operations described with regard to reference numbers 320, 330, and 340 describe a technique for ensuring that the three sets of DCI formats are associated with different DCI sizes, thereby eliminating the ambiguity regarding which DCI format is used to encode a PDCCH.

The operations described with regard to reference number 320, 330, and 340 may be performed by the UE 120 or the BS 110. As shown by reference number 320, the UE may determine whether the first set of DCI formats has a same DCI size as the second set of DCI formats. If the first set of DCI formats has a same DCI size as the second set of DCI formats, then the UE 120 may perform a padding operation so that the first set of DCI formats is associated with a different DCI size than the second set of DCI formats. For example, the UE 120 may pad a bit to one or more DCI formats of the first set of DCI formats, or may pad a bit to one or more DCI formats of the second set of DCI formats. Padding the bit to the one or more DCI formats of the second set of DCI formats may reduce a DCI size of the first set of DCI formats, thereby improving reliability of the first set of DCI formats.

As shown by reference number 330, the UE 120 may determine whether a third set of DCI formats has a same DCI size as the second set of DCI formats or the first set of DCI formats. If the third set of DCI formats has a same DCI size as the second set of DCI formats or the first set of DCI formats, then the UE 120 may perform a padding operation so that the third set of DCI formats is associated with a different DCI size than the second set of DCI formats and the first set of DCI formats. For example, the UE 120 may pad one or more bits to one or more DCI formats of the third set of DCI formats so that the first set of DCI formats, the second set of DCI formats, and the third set of DCI formats are all associated with different DCI sizes.

As shown by reference number 340, the UE 120 may determine whether a first DCI format of the third set of DCI formats (e.g., DCI Format 0_1) and a second DCI format of the third set of DCI formats (e.g., DCI Format 1_1) have different DCI sizes. If the first DCI format and the second DCI format have different DCI sizes, then the UE 120 may perform an operation to align the DCI sizes of the first DCI format and the second DCI format. For example, the UE 120 may pad a shorter DCI format so that the DCI sizes of the first DCI format and the second DCI format are aligned. In this way, the UE 120 may reduce the number of candidates to be monitored by the UE 120 by 1 (e.g., since two different DCI sizes for the third set of DCI formats would require monitoring two candidates).

As shown by reference number 350, the BS 110 may transmit a PDCCH including a DCI. The DCI may be generated in accordance with one of the DCI formats described above. As shown by reference number 360, the UE 120 may decode the PDCCH in accordance with the modified DCI formats. Since each set of DCI formats is associated with a different DCI size, the UE 120 is not exposed to ambiguity in which DCI format is used. Thus, ambiguity is reduced, thereby improving throughput and increasing the number of usable DCI configurations.

As indicated above, FIG. 3 is provided as an example. Other examples may differ from what is described with respect to FIG. 3.

Figure 4:
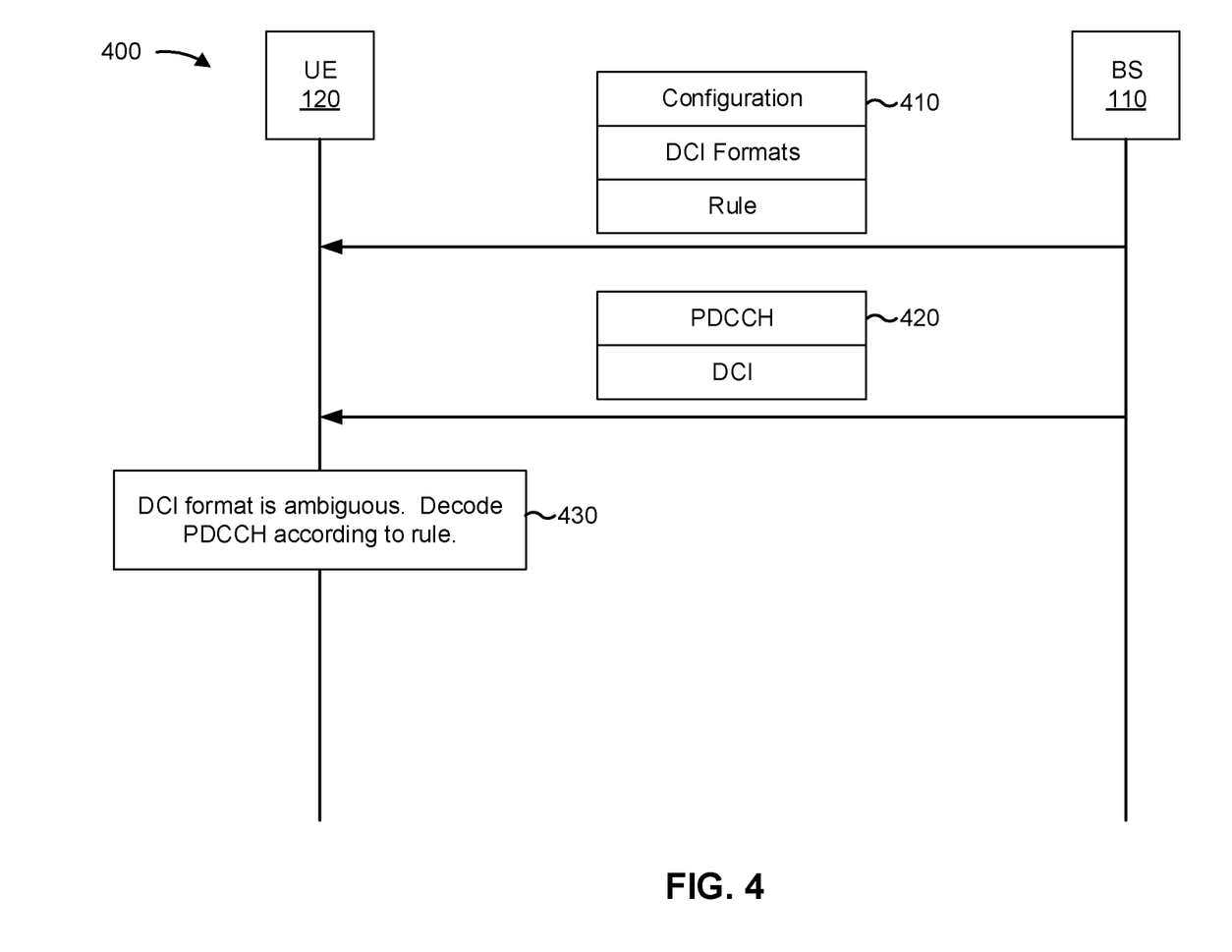
FIG. 4 is a diagram illustrating an example of decoding a PDCCH in accordance with a rule for ambiguous DCI formats, in accordance with various aspects of the present disclosure.

FIG. 4 is a diagram illustrating an example 400 of decoding a PDCCH in accordance with a rule for ambiguous DCI formats, in accordance with various aspects of the present disclosure. As shown, example 400 includes a UE 120 and a BS 110.

As shown in FIG. 4, and by reference number 410, the BS 110 may provide configuration information to the UE 120. The configuration information may indicate configurations for one or more sets of DCI formats, as described in connection with FIG. 3. In some aspects, the configuration information may indicate a rule. For example, the BS 110 may configure the UE 120 with the rule (e.g., using RRC signaling and/or the like). The rule may indicate how to resolve ambiguity between a first DCI format and a second DCI format when the first DCI format and the second DCI format are aligned with each other. This ambiguity may arise between two or more PDCCHs in certain conditions, described elsewhere herein.

As shown by reference number 420, the BS 110 may transmit, to the UE 120, a PDCCH that includes DCI. As shown by reference number 430, the UE 120 may determine that a DCI format used for the PDCCH is ambiguous. For example, the UE 120 may determine that the UE 120 cannot determine whether the PDCCH was encoded using a first DCI format or a second DCI format. This may occur when the first DCI format and the second DCI format have a same DCI size, a first PDCCH candidate and a second PDCCH candidate for the PDCCH have a same scrambling identifier, the first PDCCH candidate and the second PDCCH candidate have a same RNTI, and the first PDCCH candidate and the second PDCCH candidate have a same set of control channel elements, as described elsewhere herein.

As further shown, the UE 120 may decode the PDCCH according to the rule. For example, the UE 120 may decode the PDCCH using a PDCCH candidate associated with a selected DCI format, of the first DCI format and the second DCI format, and may drop a PDCCH candidate and/or a DCI format other than the selected DCI format. Various examples of size alignments of DCI formats, and the rules used to resolve such size alignments, are provided below.

In some aspects, a DCI Format 0_2 or 1_2 may be size-aligned with a DCI Format 0_0 or 1_0. In some aspects, the rule may indicate that the UE 120 is to prioritize DCI Formats 0_2 and 1_2. In this case, the UE 120 may only decode the DCI Format 0_2 or 1_2, and may drop the DCI Format 0_0 or 1_0. In some aspects, the rule may indicate that the UE 120 is to prioritize DCI Format 0_0 or 1_0. In this case, the UE 120 may only decode the DCI Format 0_0 or 1_0, and may drop the DCI Format 0_2 or 1_2. In some aspects, the rule may be based at least in part on a search space over which the DCI formats are configured. For example, the rule may indicate that, if the DCI format 0_0 or 1_0 is configured in a CSS, then the DCI Format 0_0 or 1_0 is to be prioritized, and that the DCI Format 0_2 or 1_2 is to be prioritized otherwise. In some aspects, the rule may be based at least in part on an RRC configuration. For example, the RRC configuration may explicitly indicate whether the BS 110 is to prioritize DCI format 0_0 or 1_0 over DCI format 0_2 or 1_2 or vice versa. As another example, the UE 120 may determine which DCI format is to be dropped, of a plurality of DCI formats, based at least in part on respective priority levels associated with each DCI format of the plurality of DCI formats.

In some aspects, a DCI Format 0_2 or 1_2 may be size-aligned with a DCI Format 0_1 or 1_1. In some aspects, the rule may indicate that the UE 120 is to prioritize DCI Formats 0_2 and 1_2. In this case, the UE 120 may only decode the DCI Format 0_2 or 1_2, and may drop the DCI Format 0_1 or 1_1. In some aspects, the rule may indicate that the UE 120 is to prioritize DCI Format 0_1 or 1_1. In this case, the UE 120 may only decode the DCI Format 0_1 or 1_1, and may drop the DCI Format 0_2 or 1_2. In some aspects, the rule may be based at least in part on an RRC configuration. For example, the RRC configuration may explicitly indicate whether the BS 110 is to prioritize DCI format 0_1 or 1_1 over DCI format 0_2 or 1_2, or vice versa.

As indicated above, FIG. 4 is provided as an example. Other examples may differ from what is described with respect to FIG. 4.

Figure 5:
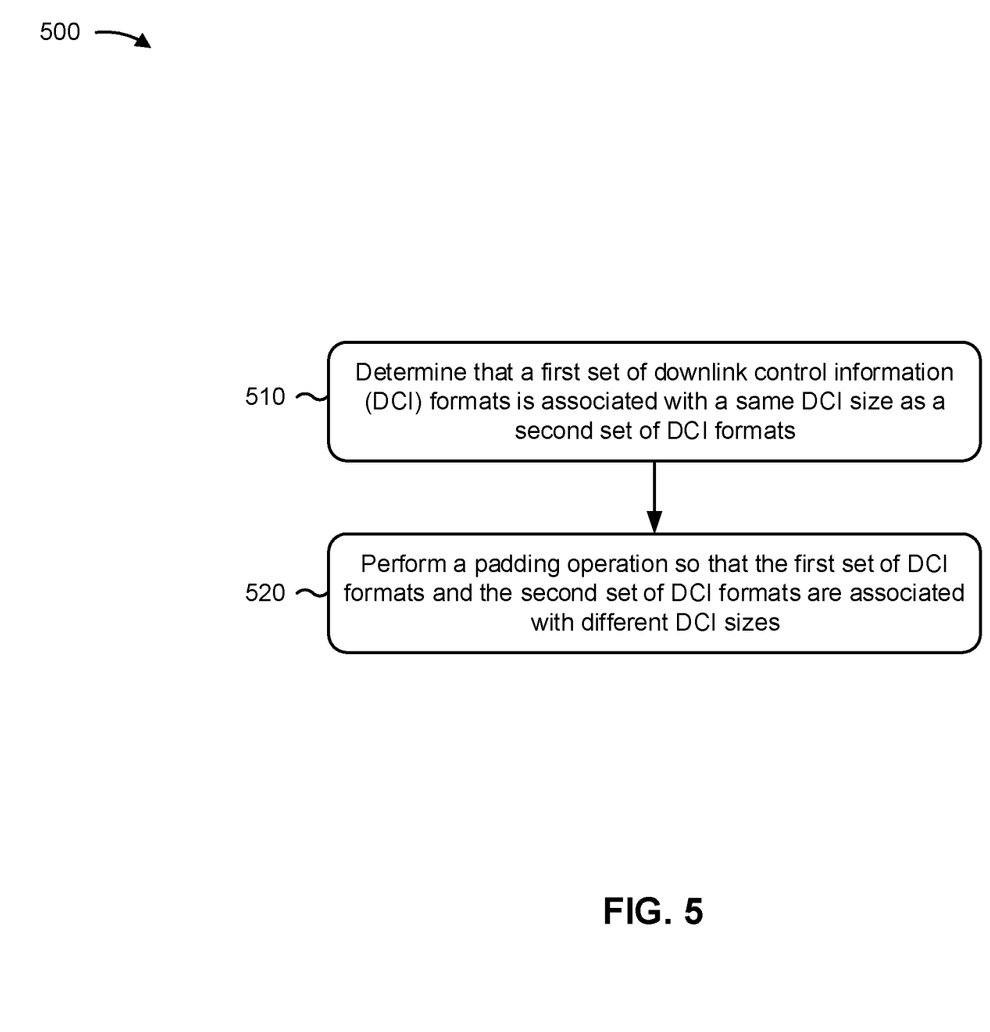
FIGS. 5 and 6 are diagrams illustrating example processes performed, for example, by a wireless communication device, in accordance with various aspects of the present disclosure.

FIG. 5 is a diagram illustrating an example process 500 performed, for example, by a wireless communication device, in accordance with various aspects of the present disclosure. Example process 500 is an example where the wireless communication device (e.g., BS 110, UE 120, and/or the like) performs operations associated with resolving DCI ambiguity.

As shown in FIG. 5, in some aspects, process 500 may include determining that a first set of DCI formats is associated with a same DCI size as a second set of DCI formats (block 510). For example, the wireless communication device (e.g., using controller/processor 280, controller/processor 240, and/or the like) may determine that a first set of DCI formats is associated with a same DCI size as a second set of DCI formats, as described above.

As further shown in FIG. 5, in some aspects, process 500 may include performing a padding operation so that the first set of DCI formats and the second set of DCI formats are associated with different DCI sizes (block 520). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may perform a padding operation so that the first set of DCI formats and the second set of DCI formats are associated with different DCI sizes, as described above.

Process 500 may include additional aspects, such as any single aspect or any combination of aspects described below and/or in connection with one or more other processes described elsewhere herein.

In a first aspect, the first set of DCI formats and the second set of DCI formats are associated with different types of communications.

In a second aspect, alone or in combination with the first aspect, process 500 includes performing a communication using one or more of the first set of DCI formats or the second set of DCI formats as modified based at least in part on the padding operation.

In a third aspect, alone or in combination with one or more of the first and second aspects, the first set of DCI formats is associated with a first search space and the second set of DCI formats is associated with a second search space.

In a fourth aspect, alone or in combination with one or more of the first through third aspects, the padding operation comprises padding a bit to one or more DCI formats of the first set of DCI formats.

In a fifth aspect, alone or in combination with one or more of the first through third aspects, the padding operation comprises padding a bit to one or more DCI formats of the second set of DCI formats.

In a sixth aspect, alone or in combination with one or more of the first through fifth aspects, process 500 includes determining whether a third set of DCI formats is associated with a same DCI size as one or more of the first set of DCI formats or the second set of DCI formats; and selectively performing another padding operation with regard to the third set of DCI formats so that the third set of DCI formats is not associated with a same DCI size as the first set of DCI formats or the second set of DCI formats.

In a seventh aspect, alone or in combination with one or more of the first through sixth aspects, process 500 includes determining whether a first DCI format of the third set of DCI formats and a second DCI format of the third set of DCI formats have a same DCI size; and selectively performing an operation that aligns DCI sizes of the first DCI format and the second DCI format with each other.

In an eighth aspect, alone or in combination with one or more of the first through seventh aspects, the second set of DCI formats are fallback DCI formats associated with the third set of DCI formats.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
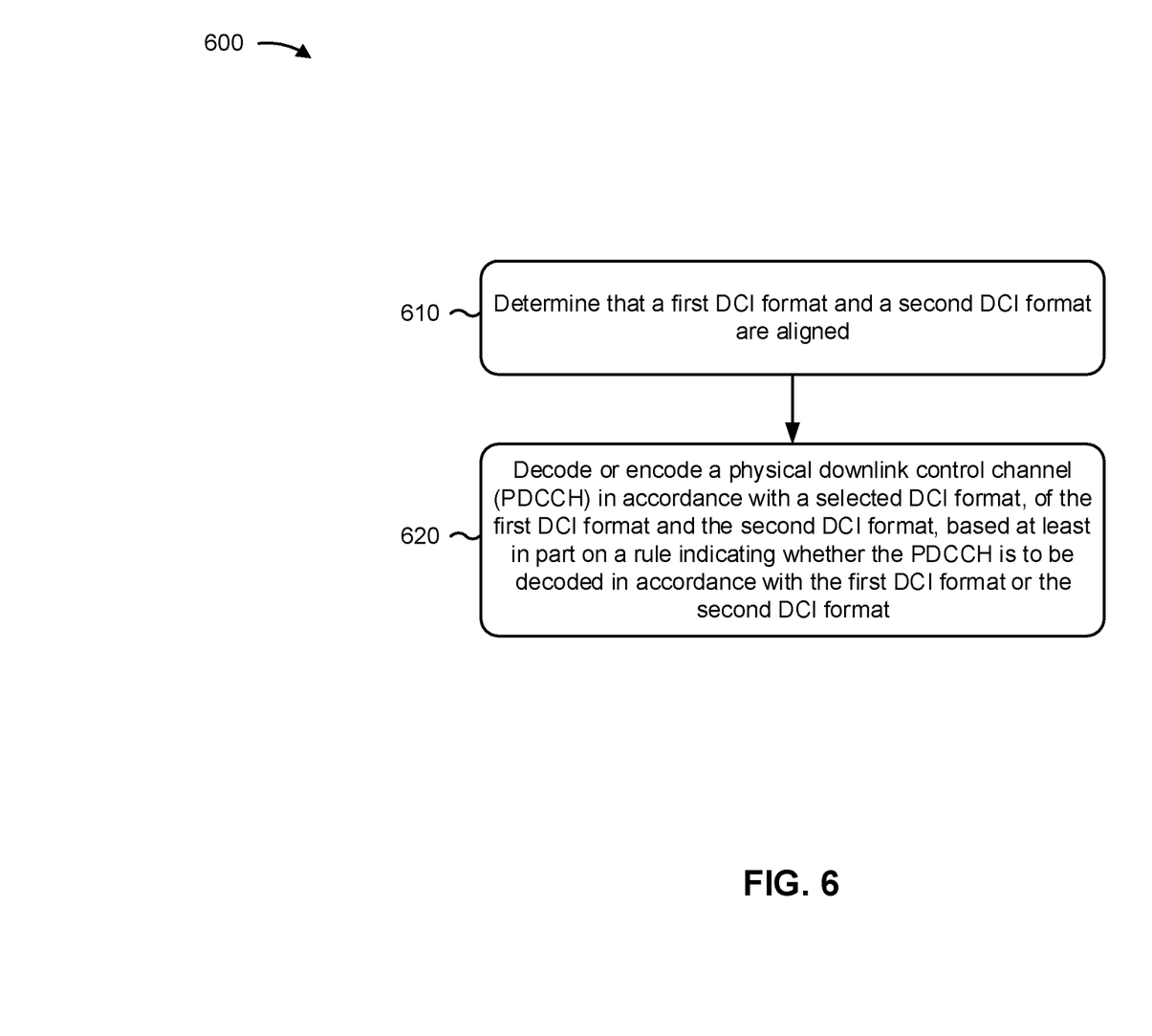

FIG. 6 is a diagram illustrating an example process 600 performed, for example, by a wireless communication device, in accordance with various aspects of the present disclosure. Example process 600 is an example where the wireless communication device (e.g., UE 120, BS 110, and/or the like) performs operations associated with resolving DCI ambiguity.

As shown in FIG. 6, in some aspects, process 600 may include determining that a first DCI format and a second DCI format are aligned (block 610). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may determine that a first DCI format and a second DCI format are aligned, as described above.

As further shown in FIG. 6, in some aspects, process 600 may include decoding or encoding a physical downlink control channel (PDCCH) in accordance with a selected DCI format, of the first DCI format and the second DCI format, based at least in part on a rule indicating whether the PDCCH is to be decoded in accordance with the first DCI format or the second DCI format (block 620). For example, the wireless communication device (e.g., using controller/processor 240, transmit processor 220, TX MIMO processor 230, MOD 232, antenna 234, antenna 252, DEMOD 254, MIMO detector 256, receive processor 258, controller/processor 280, and/or the like) may decode or encode a PDCCH in accordance with a selected DCI format, of the first DCI format and the second DCI format, based at least in part on a rule indicating whether the PDCCH is to be decoded in accordance with the first DCI format or the second DCI format, as described above.

Process 600 may include additional aspects, such as any single aspect or any combination of aspects described below and/or in connection with one or more other processes described elsewhere herein.

In a first aspect, the first DCI format and the second DCI format are associated with different types of communications.

In a second aspect, alone or in combination with the first aspect, determining that the first DCI format and the second DCI format are aligned is based at least in part on: the first DCI format and the second DCI format having a same DCI size, a first PDCCH candidate and a second PDCCH candidate for the PDCCH having a same scrambling identifier, the first PDCCH candidate and the second PDCCH candidate having a same radio network temporary identifier, and the first PDCCH candidate and the second PDCCH candidate having a same set of control channel elements.

In a third aspect, alone or in combination with one or more of the first and second aspects, the rule indicates that the PDCCH is to be decoded in accordance with the first DCI format.

In a fourth aspect, alone or in combination with one or more of the first through second aspects, the rule indicates that the PDCCH is to be decoded in accordance with the second DCI format.

In a fifth aspect, alone or in combination with one or more of the first through fourth aspects, the rule is based at least in part on respective search spaces associated with the first DCI format and the second DCI format.

In a sixth aspect, alone or in combination with one or more of the first through fifth aspects, the rule indicates that the second DCI format is to be used if the second DCI format is configured in a common search space, and that the first DCI format is to be used if the second DCI format is not configured in the common search space.

In a seventh aspect, alone or in combination with one or more of the first through sixth aspects, process 600 includes receiving or transmitting radio resource control (RRC) signaling indicating the rule.

In an eighth aspect, alone or in combination with one or more of the first through seventh aspects, the rule indicates a first priority level associated with the first DCI format and a second priority level associated with the second DCI format, and decoding the PDCCH in accordance with the selected PDCCH format comprises: dropping a DCI format, of the first DCI format and the second DCI format, other than the selected DCI format, wherein the selected DCI format is associated with a higher priority level of the first priority level and the second priority level, and the dropped DCI format is associated with a lower priority level of the first priority level and the second priority level.

In a ninth aspect, alone or in combination with one or more of the first through eighth aspects, the second DCI format is a fallback DCI format for uplink or downlink scheduling.

In a tenth aspect, alone or in combination with one or more of the first through eighth aspects, the second DCI format is a DCI format for uplink or downlink scheduling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A wireless communication device, comprising:
   a memory; and
   one or more processors coupled to the memory, the one or more processors configured to:
   determine that a first set of downlink control information (DCI) formats is associated with a same DCI size as a second set of DCI formats;
   determine, based at least in part on determining that the first set of DCI formats is associated with the same DCI size as the second set of DCI formats, whether a third set of DCI formats is associated with a same DCI size as one or more of the first set of DCI formats or the second set of DCI formats;

determine, based at least in part on determining whether the third set of DCI formats is associated with the same DCI size as the one or more of the first set of DCI formats or the second set of DCI formats, whether a first DCI format of the third set of DCI formats and a second DCI format of the third set of DCI formats have a different DCI size; and selectively perform, based at least in part on determining whether the first DCI format of the third set of DCI formats and the second DCI format of the third set of DCI formats have the different DCI size, an operation that aligns DCI sizes of the first DCI format and the second DCI format with each other.

2. The wireless communication device of claim 1, wherein the first set of DCI formats and the second set of DCI formats are associated with different types of communications.

3. The wireless communication device of claim 1, wherein the one or more processors are configured to:
perform a communication using one or more of the first set of DCI formats, the second set of DCI formats, or the third set of DCI formats based at least in part on selectively performing the operation.

4. The wireless communication device of claim 1, wherein the first set of DCI formats is associated with a first search space and the second set of DCI formats is associated with a second search space.

5. The wireless communication device of claim 1, wherein the one or more processors are configured to:
perform, based at least in part on determining whether the first set of DCI formats is associated with the same DCI size as the second set of DCI formats, a padding operation so that the first set of DCI formats is associated with a different DCI size than the second set of DCI formats.

6. The wireless communication device of claim 1, wherein the first set of DCI formats, the second set of DCI formats, and the third set of DCI formats are different sizes.

7. The wireless communication device of claim 1, wherein the one or more processors are configured to:
selectively perform, based at least in part on determining whether the third set of DCI formats is associated with the same DCI size as the one or more of the first set of DCI formats or the second set of DCI formats, a padding operation with regard to the third set of DCI formats so that the third set of DCI formats is not associated with a same DCI size as the first set of DCI formats or the second set of DCI formats.

8. The wireless communication device of claim 1, wherein the second set of DCI formats are fallback DCI formats associated with the third set of DCI formats.

9. The wireless communication device of claim 1, wherein at least one of the first set of DCI formats, the second set of DCI formats, or the third set of DCI formats are associated with a cell radio network temporary identifier.

10. A wireless communication device, comprising:
a memory; and
one or more processors coupled to the memory, the one or more processors configured to:
determine that a first downlink control information (DCI) format and a second DCI format are aligned;
decode or encode a physical downlink control channel (PDCCH) in accordance with a selected DCI format, of the first DCI format and the second DCI format, based at least in part on a rule indicating whether the PDCCH is to be decoded in accordance with the first DCI format or the second DCI format, wherein the rule indicates a first priority level associated with the first DCI format and a second priority level associated with the second DCI format; and
drop a DCI format, of the first DCI format and the second DCI format, other than the selected DCI format based at least in part on the rule, wherein the selected format is associated with a higher priority level of the first priority level and the second priority level, and wherein the DCI format is associated with a lower priority level of the first priority level and the second priority level.

11. The wireless communication device of claim 10, wherein the first DCI format and the second DCI format are associated with different types of communications.

12. The wireless communication device of claim 10, wherein determining that the first DCI format and the second DCI format are aligned is based at least in part on:
the first DCI format and the second DCI format having a same DCI size,
a first PDCCH candidate and a second PDCCH candidate for the PDCCH having a same scrambling identifier,
the first PDCCH candidate and the second PDCCH candidate having a same radio network temporary identifier, and
the first PDCCH candidate and the second PDCCH candidate having a same set of control channel elements.

13. The wireless communication device of claim 10, wherein the rule indicates that the PDCCH is to be decoded in accordance with the first DCI format.

14. The wireless communication device of claim 10, wherein the rule indicates that the PDCCH is to be decoded in accordance with the second DCI format.

15. The wireless communication device of claim 10, wherein the rule is based at least in part on respective search spaces associated with the first DCI format and the second DCI format.

16. The wireless communication device of claim 10, wherein the rule indicates that the second DCI format is to be used if the second DCI format is configured in a common search space, and that the first DCI format is to be used if the second DCI format is not configured in the common search space.

17. The wireless communication device of claim 10, wherein the one or more processors are configured to:
receive or transmit radio resource control (RRC) signaling indicating the rule.

18. The wireless communication device of claim 10, wherein the second DCI format is a fallback DCI format for uplink or downlink scheduling.

19. The wireless communication device of claim 10, wherein the second DCI format is a DCI format for uplink or downlink scheduling.

20. A method of wireless communication performed by a wireless communication device, comprising:
determining that a first set of downlink control information (DCI) formats is associated with a same DCI size as a second set of DCI formats;
determining, based at least in part on determining that the first set of DCI formats is associated with the same DCI size as the second set of DCI formats, whether a third set of DCI formats is associated with a same DCI size as one or more of the first set of DCI formats or the second set of DCI formats;

determining, based at least in part on determining whether the third set of DCI formats is associated with the same DCI size as the one or more of the first set of DCI formats or the second set of DCI formats, whether a first DCI format of the third set of DCI formats and a second DCI format of the third set of DCI formats have a different DCI size; and selectively performing, based at least in part on determining whether the first DCI format of the third set of DCI formats and the second DCI format of the third set of DCI formats have the different DCI size, an operation that aligns DCI sizes of the first DCI format and the second DCI format with each other.

21. The method of claim 20, wherein the first set of DCI formats and the second set of DCI formats are associated with different types of communications.

22. The method of claim 20, further comprising:
performing a communication using one or more of the first set of DCI formats, the second set of DCI formats, or the third set of DCI formats based at least in part on selectively performing the operation.

23. The method of claim 20, wherein the first set of DCI formats is associated with a first search space and the second set of DCI formats is associated with a second search space.

24. The method of claim 20, further comprising:
performing, based at least in part on determining whether the first set of DCI formats is associated with the same DCI size as the second set of DCI formats, a padding operation so that the first set of DCI formats is associated with a different DCI size than the second set of DCI formats.

25. The method of claim 20, wherein at least one of the first set of DCI formats, the second set of DCI formats, or the third set of DCI formats are associated with a cell radio network temporary identifier.

26. A method of wireless communication performed by a wireless communication device, comprising:
determining that a first downlink control information (DCI) format and a second DCI format are aligned;

decoding a physical downlink control channel (PDCCH) in accordance with a selected DCI format, of the first DCI format and the second DCI format, based at least in part on a rule indicating whether the PDCCH is to be decoded in accordance with the first DCI format or the second DCI format, wherein the rule indicates a first priority level associated with the first DCI format and a second priority level associated with the second DCI format; and dropping a DCI format, of the first DCI format and the second DCI format, other than the selected DCI format based at least in part on the rule, wherein the selected format is associated with a higher priority level of the first priority level and the second priority level, and wherein the DCI format is associated with a lower priority level of the first priority level and the second priority level.

27. The method of claim 26, wherein the first DCI format and the second DCI format are associated with different types of communications.

28. The method of claim 26, wherein determining that the first DCI format and the second DCI format are aligned is based at least in part on:
the first DCI format and the second DCI format having a same DCI size,
a first PDCCH candidate and a second PDCCH candidate for the PDCCH having a same scrambling identifier,
the first PDCCH candidate and the second PDCCH candidate having a same radio network temporary identifier, and
the first PDCCH candidate and the second PDCCH candidate having a same set of control channel elements.

29. The method of claim 26, wherein the rule indicates that the PDCCH is to be decoded in accordance with the first DCI format.

30. The method of claim 26, wherein the rule indicates that the PDCCH is to be decoded in accordance with the second DCI format.

* * * * *